(12) United States Patent
Mundarath et al.

(10) Patent No.: US 11,165,482 B1
(45) Date of Patent: Nov. 2, 2021

(54) EFFICIENT ENGINE AND ALGORITHM FOR CONTROL AND DATA MULTIPLEXING/DEMULTIPLEXING IN 5G NR DEVICES

(71) Applicant: NXP USA, Inc., Austin, TX (US)

(72) Inventors: Jayakrishnan Cheriyath Mundarath, Austin, TX (US); Oded Yishay, Austin, TX (US); Ahmed Hossny Anis Elsamadouny, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/998,930

(22) Filed: Aug. 20, 2020

(51) Int. Cl.
| | |
|---|---|
| *H04B 7/06* | (2006.01) |
| *H04W 72/04* | (2009.01) |
| *H04J 3/04* | (2006.01) |

(52) U.S. Cl.
CPC ......... *H04B 7/0639* (2013.01); *H04B 7/0626* (2013.01); *H04J 3/04* (2013.01); *H04W 72/0413* (2013.01)

(58) Field of Classification Search
CPC ....... H04B 7/0639; H04B 7/0626; H04J 3/04; H04W 72/0413
See application file for complete search history.

(56) References Cited

U.S. PATENT DOCUMENTS

| | | | | |
|---|---|---|---|---|
| 8,094,639 B2* | 1/2012 | Kim | ...................... | H04L 5/0053 370/342 |
| 10,187,878 B2* | 1/2019 | Lin | ...................... | H04W 72/12 |
| 10,310,976 B2* | 6/2019 | Chung | .................. | G06F 3/0683 |
| 2008/0153425 A1* | 6/2008 | Heo | ........................ | H04L 1/001 455/68 |
| 2008/0233964 A1 | 9/2008 | McCoy et al. | | |
| 2012/0207067 A1* | 8/2012 | Malladi | .............. | H04B 7/15507 370/281 |
| 2016/0157222 A1 | 6/2016 | Kerhuel | | |
| 2017/0013612 A1 | 1/2017 | Nayeb Nazar et al. | | |

(Continued)

FOREIGN PATENT DOCUMENTS

WO WO2017140344 A1 8/2017

OTHER PUBLICATIONS

Jim Zyren, NXP, Overview of the 3GPP Long Term Evolution Physical Layer, white paper, Rev 0, Jul. 2007.
(Continued)

*Primary Examiner* — Jaison Joseph

(57) ABSTRACT

A method and apparatus (200A) are provided for multiplexing data and uplink control bitstreams on a 5G-NR uplink by generating a multiplexing configuration structure with one or more processors (201) and supplying the data and uplink control bitstreams to a multiplexing engine (214) which includes an index calculation logic circuit (212) and multiplex selector circuit (213), where the index calculation logic circuit is configured with the multiplexing configuration structure (CONFIG) to execute an iterative data-control multiplexing algorithm which generates ordered selection indices in sequential order (MUX_SEL), and where the multiplex selector circuit receives and selects m-bit sequences from the data bitstream and one or more uplink control bitstreams for output into a multiplexed output stream according to the ordered selection indices generated by the index calculation unit, where m is an integer greater than or equal to 1.

20 Claims, 6 Drawing Sheets

(56) References Cited

U.S. PATENT DOCUMENTS

| | | | |
|---|---|---|---|
| 2019/0037586 A1 | 1/2019 | Park et al. | |
| 2019/0223205 A1* | 7/2019 | Papasakellariou | H04L 5/00 |
| 2019/0342046 A1 | 11/2019 | Guo et al. | |
| 2020/0052835 A1 | 2/2020 | Xiong et al. | |
| 2020/0077386 A1 | 3/2020 | Papasakellariou | |
| 2020/0177351 A1* | 6/2020 | Chen Larsson | H04L 5/0044 |
| 2020/0186294 A1* | 6/2020 | Kawasaki | H04L 1/0016 |
| 2020/0205148 A1 | 6/2020 | Yoshioka et al. | |

OTHER PUBLICATIONS

3GPP, 3rd Generation Partnership Project; Technical Specification Group Radio Access Network; NR; Multiplexing and channel coding (Release 15), 3GPP TS 38.212 V15.6.0 (Jun. 2019).

Lopamudra Kundu et al., Physical Uplink Control Channel Design for 5G New Radio, Computer Science, Engineering, 2018 IEEE 5G World Forum (5GWF).

* cited by examiner

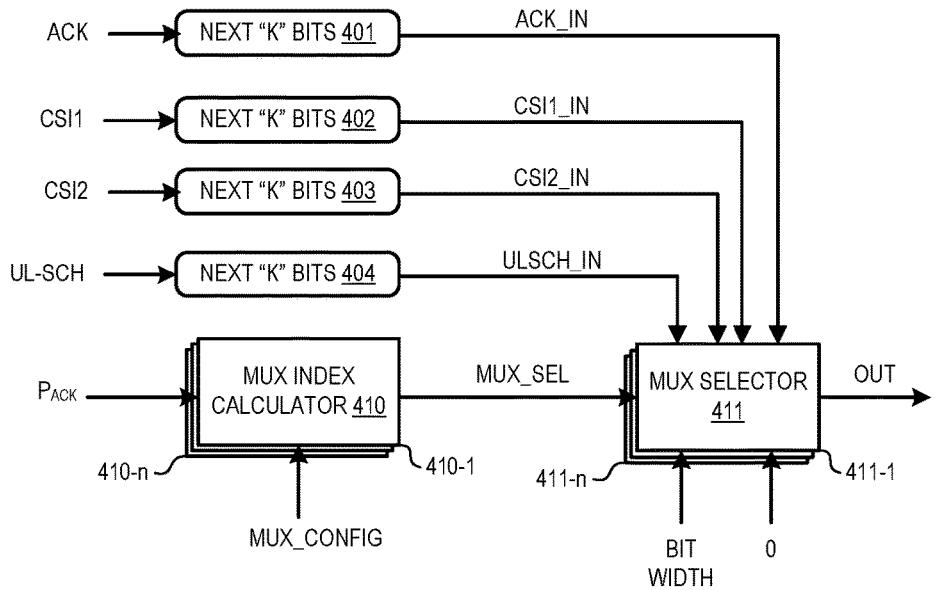

*Figure 4*

| PARAMETER | DESCRIPTION | SIZE (BITS) |
| --- | --- | --- |
| P_ack | Bit indicating whether puncturing is enable do not | 1 |
| bits_RE | Scalar denoting number of bits per RE | 7 |
| n_RE[14] | 14x1 vector denoting number of REs available for UL-SCH or UCI mapping per symbol | 14x12=168 |
| n_ack_RE[14] | 14x1 vector denoting number of ACK REs to be mapped symbol | 14x12=168 |
| n_ack2_RE[14] | 14x1 vector denoting number of ACK REs to be mapped symbol when puncturing enabled | 14x12=168 |
| n_csi1_RE[14] | 14x1 vector denoting number of CSI1 REs to be mapped per symbol | 14x12=168 |
| n_csi2_RE[14] | 14x1 vector denoting number of CSI2 REs to be mapped per symbol | 14x12=168 |
| n_ulsch_RE[14] | 14x1 vector denoting number of ULSCH REs to be mapped per symbol | 14x12=168 |
| d_ack[14] | 14x1 vector denoting "skip offset" for ACK REs per symbol | 14x12=168 |
| d_ack2[14] | 14x1 vector denoting "secondary skip offset" for ACK REs per symbol when puncturing enabled | 14x12=168 |
| d_csi1[14] | 14x1 vector denoting "skip offset" for CSI1 REs per symbol | 14x12=168 |
| d_csi2[14] | 14x1 vector denoting "skip offset" for CSI2 REs per symbol | 14x12=168 |

*Figure 5*

EFFICIENT ENGINE AND ALGORITHM FOR CONTROL AND DATA MULTIPLEXING/DEMULTIPLEXING IN 5G NR DEVICES

BACKGROUND OF THE INVENTION

Field of the Invention

The present invention is directed in general to field of information processing. In one aspect, the present invention relates to an apparatus, system and method for receiving and processing data stream via next generation cellular communication systems.

Description of the Related Art

With mobile and remote data access over a high-speed communication networks, the ability to accurately deliver and decode data streams has become increasingly challenging and difficult. The latest example from the Third Generation Partnership Project (3GPP) is the Fifth Generation (5G) New Radio (NR) radio access communications technology which replaces the predecessor standards, such as 4G LTE, by offering higher data rates, lower latencies, better coverage, and increased deployment flexibility. However, the enhanced feature set in 5G NR greatly increases the complexity of edge devices and infrastructure equipment. For example, the 5G NR includes a requirement for Uplink Control Information (UCI) multiplexing which combines physical layer data and control communications on the uplink (UL) on to the physical data channel, Physical Uplink Shared Channel (PUSCH). In particular, data bits (or shared channel bits) from the PUSCH channel are channel encoded using a LDPC (Low Density Parity Code) encoder, while control information bits (or UCI bits) may be channel encoded using a polar encoder or short block, depending on the size of the UCI control bits which can include acknowledgements (ACK) for one or more code blocks received on the downlink data channel, UL scheduling requests, and narrowband and wideband channel state information (CSI) feedback.

In addition, UCI control bits may be aggregated from across multiple downlink carriers (when using carrier aggregation) to be transmitted on a single instance of PUCCH or PUSCH on one of the UL carriers. To combine the uplink control and data bits, the 5G NR specification TS38.212 specifies a data and control multiplexing requirement that follows a specified procedure (38.212: Section 6.2.7) for interleaving the one or more encoded UCI control bit streams with the encoded data bit stream. For example, in each of the example bit streams, the 5G NR specification requires that, when UCI control bits need be transmitted in a specific transmission time interval (TTI) which has a PUSCH scheduled, the polar encoded UCI control bits shall be multiplexed along with the shared channel LDPC encoded data bits on the PUSCH.

Additionally, under certain conditions, the data and control multiplexing process must allow some UCI control bits to "puncture" or replace the data bits in specified situations. As understood by those skilled in the art, "puncturing" refers to a process for mapping m-bits of a first input stream to a multiplexed output location, and then subsequently overwriting the same m-bits by m-bits from a second input stream. The multiplexed bit stream is then scrambled and sent to the modulator chain that transmits the PUSCH which contains the data and UCI on the physical UL resources. The UL receiver implements the demodulation chain and delivers log likelihood ratios (LLRs) for the combined bit stream to the descrambler. After descrambling, the LLRs for the combined bit stream are de-multiplexed to extract the encoded LLRs from the multiple UCIs and the shared data channel. The UCI LLRs are sent to their respective polar decoders while the data LLRs are sent to the LDPC decoder.

Although sections in the 3GPP specification provide indexing algorithms for multiplexing these different streams of bits, there are significant technical challenges for implementing a multiplexer function that takes four independently coded input control and data bit streams and outputs a single bit stream with bits, especially where, as here, the indexing algorithm depends on numerous, dynamically configured parameters for the specific PUSCH transmission. Additional challenges arise from the requirement in the indexing algorithm that the locations in the multiplexer output be calculated for all of the input data and control channels before performing the actual multiplexing. As a result, a straightforward implementation of the specification's indexing algorithm involves many complex calculations that are not suitable for implementation by an application specific integrated circuit or hardware since there would be prohibitive hardware costs for implementing the 5G NR data/control multiplexing algorithm, as well as large latency and pipelining barriers to precomputing all indices prior to actual multiplexing operations. In addition, an implementation of the indexing algorithm with a control processor or software for calculating the source stream for each output bit stream in order per the 5G NR UCI-data multiplexing algorithm imposes a huge computational overhead for the processor/software, along with prohibitively large configuration messages between processor and multiplexer. As seen from the foregoing, the existing solutions for multiplexing uplink data and control bits are extremely difficult at a practical level by virtue of the challenges with performing uplink processing with low latency, low cost, low complexity communication systems.

BRIEF DESCRIPTION OF THE DRAWINGS

The present invention may be understood, and its numerous objects, features and advantages obtained, when the following detailed description of a preferred embodiment is considered in conjunction with the following drawings.

FIG. 4 is a simplified block diagram illustration of a control and data multiplexing engine for use with uplink 5G NR transmissions in accordance with selected embodiments of the present disclosure.

FIG. 5 depicts an example multiplexing configuration structure for an index calculator in accordance with selected embodiments of the present disclosure.

DETAILED DESCRIPTION

Figure 1:
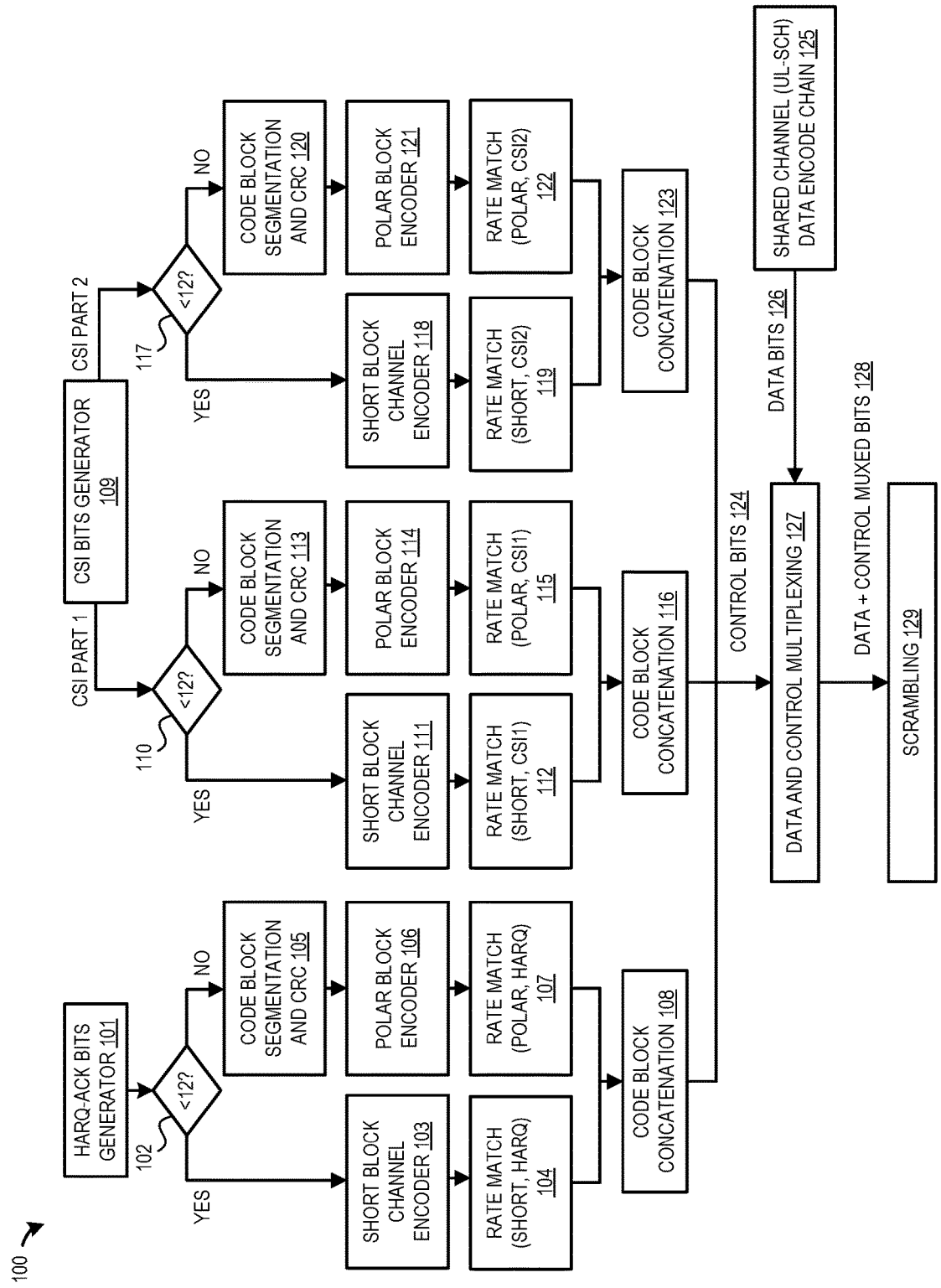
FIG. 1 depicts an encoding chain for generating and multiplexing uplink control and data information on a Physical Uplink Shared Channel as specified in a 5G NR specification.

A data-control multiplexing/demultiplexing apparatus, system, architecture, methodology, and program code are described for implementing a full-featured data-control multiplexing on a 5G NR uplink device with a very reduced silicon footprint by configuring hardware multiplexing logic circuitry with a stepping algorithm that calculates for each subsequent output location, one per iteration, the input data or uplink control information stream to multiplex from. As will be appreciated, the stepping algorithm may also be configured to calculate selection indices for a plurality of next output locations per iteration. As disclosed, the data-control multiplexing/demultiplexing apparatus includes an index calculation unit and multiplexer/demultiplexer unit that uses a configuration structure of ordered selection indices from the index calculation unit to create the multiplexed/demultiplexed output bit stream.

In selected embodiments, the index calculation unit may be embodied in hardware to implement a lightweight iterative data-control multiplexing algorithm as a state machine to generate selection indices in sequential order as required by the output multiplexer/demultiplexer output. In selected embodiments, the index calculation unit may be configured to generate a single index or multiple indices (n) per clock cycle. In addition, the multiplexer unit may be embodied in hardware as a selector that chooses bit(s) from one of the input control and data bit streams for the next output bit(s) based on the index provided by the index calculation unit. For example, the multiplexer unit may be configured to multiplex multiple m-bit sections of the input streams into the output stream. In selected embodiments, the multiplexer unit may be configured to multiplex a single instance or "n" instances of m-bit sections per clock cycle based on the n indices generated by the index generation unit within a clock cycle.

As disclosed, the number n of indices per clock cycle is a function of the bandwidth (bw) or throughput (in bits per second) and the element size m (the number-of-bits) so that n≥1. By providing the lightweight iterative data-control multiplexing algorithm as a simple sequential state machine which abstracts the bulky 5G NR uplink data-control multiplexing algorithm by iteratively calculating the index for only the candidate for the "next" output location in each iteration, the index calculation unit works with a simple multiplexer unit to achieve the full required functionality with reduced logic, lower computational overhead, and compact control messaging. By avoiding the need to pre-compute for the entire output stream, the lightweight iterative data-control multiplexing algorithm provides significant improvements over the indexing algorithm specified in the 5G NR standard in terms of computational overhead by a control processor and large configuration message requirements. In addition, all aspects of the disclosed data-control multiplexing/demultiplexing hardware—the encoder chains, the index calculation and the multiplexing—can be pipelined, further reducing latency and improving performance.

To provide additional details for an improved contextual understanding of the present disclosure, reference is now made to FIG. 1 which depicts an encoding chain 100 for generating and multiplexing uplink control information (UCI) and data information on a Physical Uplink Shared Channel (PUSCH) as specified in a 5G NR specification, 3GPP TS38.212, Rel 15.6.0.

As illustrated, the UCI control bits can be split into up to three independently-coded bit streams. In a first bit stream encoding sequence, the generated HARQ-ACK bits 101 (38.212: Section 6.3.2.1.1) are processed at steps 102-108 into a first code block concatenation 108 (38.212: Section 6.3.2.5) based on a determination at 102 if the HARQ-ACK bitstream is a short block or not. For example, if the bit stream is less than 12 bits long, the HARQ-ACK bits are processed with short block channel encoding 103 (38.212: Section 6.3.2.3.2) and rate matching for short HARQ 104 (38.212: Section 6.3.2.4.2.1). Alternatively, longer blocks of HARQ-ACK bits (e.g., ≥12) are processed with code block segmentation and CRC attachment 105 (38.212: Section 6.3.1.2.1), polar block encoding 106 (38.212: Section 6.3.2.3.1), and rate matching for polar HARQ 107 (38.212: Section 6.3.2.4.1.1). In a second bit stream encoding sequence, the CSI Part 1 bits from the CSI bits generator 109 (38.212: Section 6.3.2.1.2) are processed at steps 110-116 into a second code block concatenation 116 (38.212: Section 6.3.2.5) based on a determination at 110 if the CSI Part 1 bitstream is a short block or not. For example, if the CSI Part 1 bit stream is less than 12 bits long, the CSI Part 1 bits are processed with short block channel encoding 111 (38.212: Section 6.3.2.3.2) and rate matching for short CSI1 112 (38.212: Section 6.3.2.4.2.1). Alternatively, longer blocks of CSI Part 1 bits (e.g., ≥12) are processed with code block segmentation and CRC attachment 113 (38.212: Section 6.3.1.2.1), polar block encoding 114 (38.212: Section 6.3.2.3.1), and rate matching for polar CSI-1 115 (38.212: Section 6.3.2.4.1.2). And in a third bit stream encoding sequence, the CSI Part 2 bits from the CSI bits generator 109 (38.212: Section 6.3.2.1.2) are processed at steps 117-123 into a third code block concatenation 123 (38.212: Section 6.3.2.5) based on a determination at 117 if the CSI Part 2 bitstream is a short block or not. For example, if the CSI Part 2 bit stream is less than 12 bits long, the CSI Part 2 bits are processed with short block channel encoding 118 (38.212: Section 6.3.2.3.2) and rate matching for short CSI2 119 (38.212: Section 6.3.2.4.2.3). Alternatively, longer blocks of CSI Part 2 bits (e.g., ≥12) are processed with code block segmentation and CRC attachment 120 (38.212: Section 6.3.1.2.1), polar block encoding 121 (38.212: Section 6.3.2.3.1), and rate matching for polar CSI-2 122 (38.212: Section 6.3.2.4.1.3). The code block concatenations 108, 116, 123 are combined to form the encoded UCI control bit streams 124. In addition, the data bits are processed at step 125 (38.212: Section 6.2) in the shared channel (UL-SCH) data encode chain.

To combine the uplink control bits 124 and data bits 126, the 5G NR specification specifies a data and control multiplexer 127 that follows a specified procedure (38.212: Section 6.2.7) for interleaving the one or more encoded UCI control bit streams 124 with the encoded data bit stream 126. For example, in each of the example bit streams, the 5G NR specification requires that, when UCI control bits need be transmitted in a specific transmission time interval (TTI) which has a PUSCH scheduled, the polar/short-block encoded UCI control bits shall be multiplexed along with the shared channel LDPC encoded data bits 126 on the PUSCH. Additionally, under certain conditions, the data and control multiplexer process 127 must allow some UCI control bits to "puncture" or replace the data bits in specified situations. The multiplexed bit stream 128 is then scrambled 129 (38.212: Section 6.3.1.1) and sent to the modulator chain that transmits the PUSCH which contains the data and UCI on the physical UL resources. The UL receiver implements the demodulation chain and delivers the combined bit stream to the descrambler. After descrambling the combined bit stream is de-multiplexed to extract the encoded bits from the multiple UCIs and the shared data channel. The UCI bits are sent to their respective polar decoders while the data bits are sent to the LDPC decoder.

Figure 2:
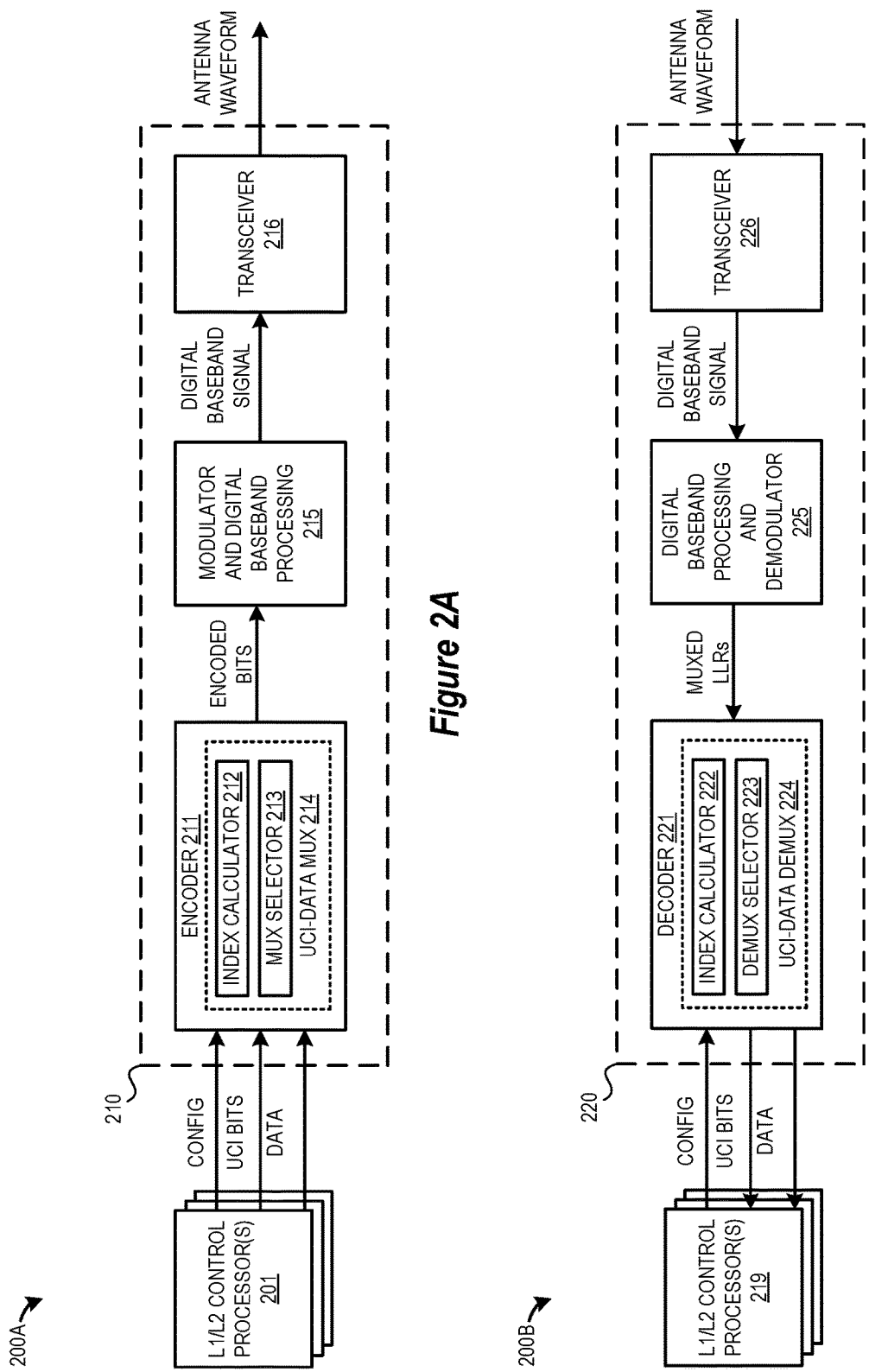
FIGS. 2A-B illustrate simplified block diagrams of a transmitter and receiver system utilized for uplink transmission and reception in accordance with selected embodiments of the present disclosure.

To provide additional details for an improved understanding of selected embodiments of the present disclosure, reference is now made to FIG. 2A which illustrates a simplified block diagram 200A of a transmitter system 210 which is controlled by one or more control processors 201 to provide uplink transmission. In addition, FIG. 2B illustrates a simplified block diagram 200B of a receiver system 220 which is controlled by one or more control processors 219 to provide uplink reception. A data-control multiplexing/demultiplexing apparatus described herein may be included in a transmitter system 210, receiver system 220, or combination transceiver system used for communicating uplink control and data information with a 5G NR device. As illustrated, the transmitter system 210 and receiver system 220 are controlled, respectively by one more control processors 201, 219, which may each include a digital L1 processor subsystem and/or digital L2 processor subsystem. In selected embodiments, the digital L1 processor subsystem 201, 219 may be configured to perform baseband processing commensurate with the physical layer processing requirements of the communication protocol, including but not limited to generating multiplex/demultiplex configuration bits (CONFIG) and also generating or receiving Uplink Control Information (UCI) bits. In addition, the digital L2 processor subsystem 201, 219 may be configured to perform higher layer processing commensurate with the data link layer requirements of the communication protocol, including but not limited to generating or receiving shared channel LDPC encoded uplink data payload bits (DATA).

As depicted in FIG. 2A, the transmitter system 210 includes an encoder 211 for multiplexing UCI bits and data payload information into encoded bits, a modulator and digital baseband processing unit 215 for generating a digital baseband signal from the encoded bits, and a transceiver 216 for generating an antenna waveform from the digital baseband signal. As depicted in FIG. 2B, the receiver system 220 includes a transceiver 226 for receiving an antenna waveform and generating a digital baseband signal, a receiver digital baseband processing chain and demodulator 225 for extracting multiplexed log likelihood ratio (LLR) values from the digital baseband signal, and a decoder 221 for demultiplexing and extracting UCI bits and data payload information. As will be appreciated, the specific implementation details of the transmitter blocks 211, 215, 216 and receiver blocks 221, 225, 226 can vary, depending on the application. For example, the encoder and decoder chains 211, 221 may each be embodied with one or more forward error correction units. In addition, the modulator and demodulator chains 215, 225 may each be embodied with one or more vector signal processing accelerator (VSPA) hardware units which perform symbol modulation and demodulation processing. Likewise, the transmit transceiver 216 may include an up-converter, a digital-to-analog converter, and power amplifier for sending the antenna waveform to an antenna array, while the receiver transceiver 226 may include a low noise amplifier (LNA), analog-to-digital converter, and down converter for transforming a received antenna waveform into a digital baseband signal. Additional elements, such as, for example, a gain control block (both analog and digital), an impairment correction block, or a timing tracking block, local oscillator, acquisition and frequency correction block, or combinations thereof, may also be included in transmitter system 210 and receiver system 220.

During operation of transmitter system 210, digital data to be transmitted to a receiver system 220 of a receiving device is provided to encoder 211 which is configured to encode the digital data into a form suitable for modulation by modulator 215. For example, encoder 211 may implement a voice or image codec that translates the digital data into a binary data stream. In selected embodiments, encoder 211 is also configured to implement a forward error correction scheme to transform the binary data stream (digital data) into a form suitable for detecting channel errors that may occur during data transmission, such as by adding redundancy bits to the binary data stream. In accordance with the 5G NR communication protocol requirements for multiplexing uplink control information with channel encoded data bits, the encoder 211 includes a UCI-data multiplexer 214 which is implemented in hardware with an index calculator unit 212 and a multiplexer selector unit 213 which multiplex input UCI control and data bits onto an output stream under control of the multiplex configuration bits (CONFIG). In operation, the index calculator unit 212 implements a Logical Next Step (LNS) algorithm as a state machine that generates selection indices in sequential order as required by the output. The multiplexer selector unit 213 chooses bit(s) from one of the input streams for the next output bit(s) based on the index provided by the index calculator unit 212, thereby generating output encoded bits.

During transmission, the encoded and multiplexed output bitstream from the encoder 211 is provided to the modulator 215 which may be configured to implement any suitable modulation scheme as stipulated by the standard (such as BPSK, QPSK, M-QAM, or the like) for converting the encoded bit stream into an analog signal form suitable for transmission, such as on a wireless medium. In selected embodiments, the modulator 215 uses a VSPA hardware unit to implement a cyclic prefix orthogonal frequency-division multiplexing (CP-OFDM) modulation scheme, though a discrete Fourier transform spread orthogonal frequency division multiplexing (DFT-s-OFDM) modulation scheme may also be used. Generally, the modulator 215 is configured to translate the encoded and multiplexed output bitstream into a digital baseband signal as stream of data symbols. The output of modulator 215 is provided to the transceiver 216 which is configured to translate the digital baseband input signal into an analog signal at the radio frequency in which bandwidth has been allocated for the transmission. The processing at the transceiver 216 may include digital to analog conversion processing, filtering, sample rate conversion, and power amplification to a sufficient power lever for transmitting the antenna waveform over an antenna array (not shown).

During operation of receive system 220, a radio frequency (RF) analog signal received at an antenna (not shown) is provided as an antenna waveform to the receiver transceiver 226 which is configured to translate the received RF analog signal into a digital baseband output signal. The processing at the transceiver 226 may include a low noise amplifier, filtering, sample rate conversion, and analog to digital conversion processing. The output of transceiver 226 is provided to the demodulator 225 which is configured to implement any suitable demodulation scheme that is counterpart to the modulation scheme implemented in modulator 215. In selected embodiments, the demodulator 225 uses a VSPA hardware unit to implement a CP-OFDM demodulation scheme, though a DFT-s-OFDM demodulation scheme may also be used. Generally, the demodulator 225 is configured to translate the digital baseband signal into LLR values corresponding to the encoded and multiplexed output bitstream. The decoder 221 receives the output of demodulator 226, including the multiplexed LLR values, and is configured to detect and correct errors of the received binary data stream according to the error correction scheme also utilized by encoder 211. The decoder 221 may also be configured to remove redundancy bits from the binary data stream and/or to decode the data stream LLRs into digital data bits, as counterpart to the format utilized by encoder 211.

In accordance with the 5G NR communication protocol requirements for demultiplexing the multiplexed LLR values into separate uplink control information and data bits, the decoder 221 includes a UCI-data demultiplexer 224 which is implemented in hardware with an index calculator unit 222 and a demultiplexer selector unit 223 which demultiplexes the input multiplexed LLR values into separate UCI control and data bits under control of the multiplex configuration bits (CONFIG). In operation, the index calculator unit 222 is identical to the index calculator 212 in using the same LNS algorithm, except it works on LLR values corresponding to each bit position to generate selection indices in sequential order as required by the output of the decoder 221. In particular, the demultiplexer selector unit 223 chooses LLRs from the input multiplexed LLR values for output from the UCI-data demultiplexer 224 based on the index provided by the index calculator unit 222, thereby generating separate output UCI and data LLR streams. These separate output UCI and data LLR streams from the decoder 221 are then provided to the one or more processors 219 for further digital signal processing.

Figure 3:
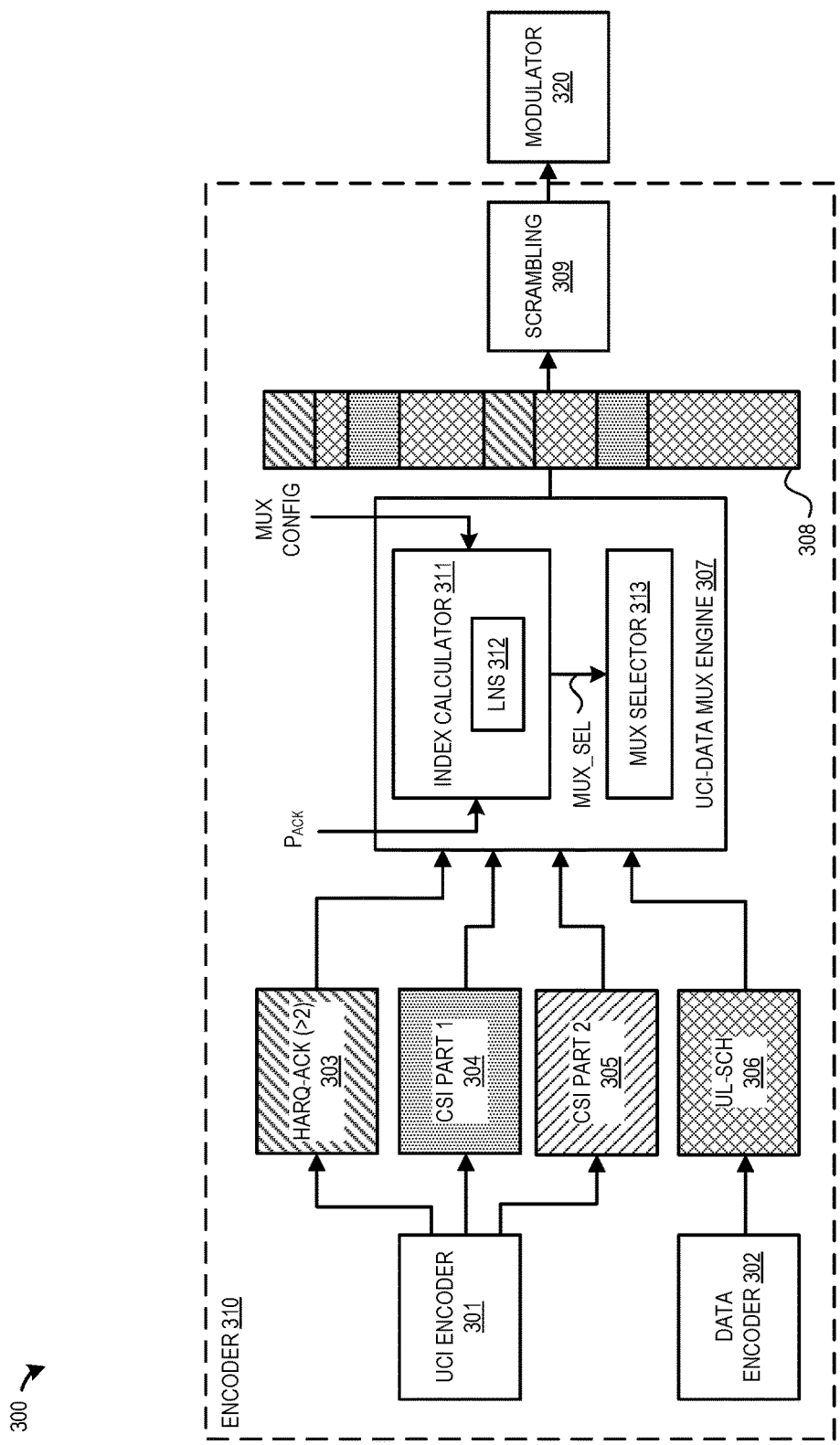
FIG. 3 is a simplified block diagram illustration of an uplink data and control multiplexer system in accordance with selected embodiments of the present disclosure.

To provide additional details for an improved understanding of selected embodiments of the present disclosure, reference is now made to FIG. 3 which illustrates a simplified block diagram illustration of an uplink data and control multiplexer system 300 which may be implemented in the encoder block 310 of a transmitter system. As depicted, the encoder 310 may include one or more UCI encoders 301 which generate encoded streams for each corresponding UCI channel, such as an HRQ-ACK encoded stream 303, CSI Part 1 encoded stream 304, and CSI Part 2 encoded stream 305. In addition, the encoder 310 may include a data encoder 302 which generates an encoded stream for an uplink data channel.

The depicted encoder 310 also includes a UCI-data multiplexer engine 307 where the different encoded streams from the 3 UCI channels 303-305 and the data channel 306 are interleaved into multiplexed output 308 according to a pattern in the 5G NR specifications. In addition to interleaving, under certain configurations, the UCI-data multiplexer engine 307 needs to map bits from one of the incoming streams 303-306 to certain locations of the output stream 308 and subsequently "puncture" them with bits from one of the other streams. To this end, the UCI-data multiplexer engine 307 includes an index calculator hardware unit 311 and a multiplex selector hardware unit 313. The disclosed index calculator hardware unit 311 implements a lightweight iterative Logical Next Step (LNS) multiplexing algorithm 312 as a state machine to generate selection indices in sequential order as required by the UCI-data multiplexer engine 307. In turn, the multiplex selector hardware unit 313 chooses bit(s) from one of the input streams 303-306 for the next output bit(s) 308 based on the index provided by the index calculator hardware unit 311.

As disclosed herein, the UCI-data multiplexer engine 307 provides a lightweight iterative LNS multiplexing algorithm 212 as a simple sequential state machine which abstracts the bulky 5G NR uplink data-control multiplexing algorithm. In particular, the "data and control multiplexing" requirements (38.212: Section 6.2.7) set forth a complicated procedure for multiplexing uplink data and control bits that is very complicated for ASIC implementation and demands large data buffers for precomputing all indices for the multiplexed input data channels before starting the actual multiplexing, resulting in prohibitive processing overhead and large processing latency. To reduce or eliminate the overhead requirements and related latency and storage requirements, the tasks of the "data and control multiplexing" requirements (38.212: Section 6.2.7) are abstracted into a sequence of iterative index calculations by the index calculator hardware unit 311 for only the candidate for the "next" output location in each iteration which are then used by the multiplex selector hardware unit 313 to create the multiplexed output stream.

To control the operation of the UCI-data multiplexer engine 307, an external computational entity may implement a multiplexer configuration generator using any suitable digital signal processing (DSP) processors or central processing unit (CPU) processors to calculate a multiplexer configuration structure (MUX CONFIG) to be passed to the UCI-data multiplexer engine 307. In an example embodiment, the size of the configuration message is about 1688 bits, and the computational cost is about ~1000 FLOPs. For example, the external computational entity may be an on-chip processor (e.g., L1 control processor) that configures the UCI-data multiplexer engine 307 using a control structure (MUX CONFIG) to define the MUXing pattern that is input to the index calculator hardware unit 311. The external processor may also provide an input control bit $P_{ACK}$ to the index calculator hardware unit 311 that denotes whether puncturing is enabled or not. When enabled by the input control bit $P_{ACK}$, the index calculator 311 may be set to allow certain locations in the output stream 308 (e.g., CSI2 and data bits) to be marked for occupancy by one or more of the incoming streams (e.g., HARQ-ACK) so that bits from one of the streams, predetermined by the multiplexing algorithm, actually get mapped to those locations while an equal number of bits from the other stream gets pulled from the incoming buffer and discarded. The multiplexed output bit stream 308 is then processed for uplink control information at the scrambler 309 and sent to the modulator chain 320 that transmits the PUSCH containing the data and UCI on the physical UL resources.

To provide additional details for an improved understanding of selected embodiments of the present disclosure, reference is now made to FIG. 4 which illustrates a simplified block diagram illustration of a control and data multiplexing engine 400 for use with multiplexing control and data on 5G NR uplink transmissions. As depicted, the control and data multiplexing engine 400 includes input control and data bitstream buffers 401-404 for storing the input streams to be multiplexed, a multiplexer index calculator 410 for generating selection indices under control of a configuration structure, and a multiplexer selector 411 for choosing bits from one of the input streams for the next output bit(s) based on the selection indices provided by the index calculation unit 410.

The input streams stored in the buffers 401-404 may include input control bitstream sequences, such as ACK bits, CSI part 1 (CSI1), and CSI part2 (CSI2) bits, that are stored, respectively in the K bit input buffers 401-403. This control information is to be multiplexed with the UL-SCH data bits stored in the K bit input buffer 404. The input control and data bitstream sequences 401-404 may be generated by one or more control processors and stored in K-bit buffers as K-bit sequences 401-404.

The multiplexer index calculator 410 is connected to receive multiplexing control information, and to generate out an output configuration vector of ordered selection indices (MUX_SEL). As disclosed herein, the multiplexing control information may be generated by one or more control processors which calculate a multiplexer configuration structure (MUX_CONFIG) and input puncture control bit $P_{ACK}$. In selected embodiments described more fully below, the multiplexer configuration structure (MUX_CONFIG) may be a simple configuration structure that specifies a plurality of index calculation parameters for use in the lightweight iterative LNS multiplexing algorithm that is implemented in hardware as a state machine to output a configuration vector of ordered selection indices (MUX_SEL). The ordered selection indices (MUX_SEL) may be computed to specify one of a plurality of predetermined index selection values for the input control and bit streams, including a first index selection value for a HARQ-ACK control bit (POS_ACK), a second index selection value for a CSI-1 control bit (POS_CSI1), a third index selection value for a CSI-2 control bit (POS_CSI2), fourth index selection value for a data bit (POS_ULSCH), a fifth index selection value for replacing CSI2 control bits with ACK control bits (POS_RCSI2_ACK), a sixth index selection value for replacing UL-SCH data bits with ACK control bits (POS_RULSCH_ACK), and a seventh index selection value for inserting the optional "0" input (POS_ZERO). In selected embodiments, the multiplexer index calculator 410 may be embodied in hardware to implement the LNS algorithm as a state machine to calculate the MUX selector action (denoted by MUX_SEL) for the next set of output bit(s). In addition, the multiplexer index calculator 410 may be embodied as a single instance 410-1 to generate a single index value per cycle, or may be embodied as multiple or n instances 410-1 through 410-n to generate a multiple index values per cycle.

The multiplexer selector 411 is connected to receive the input control bit streams (e.g., ACK_IN, CSI1_IN, CSI2_IN) and input data bit streams (e.g., ULSCH_IN) from the K-bit buffers 401-404, and to select from the individual buffers for multiplexing into an output stream OUT of multiplexed input stream values. To control the selection, the multiplexer selector 411 is also connected to receive the configuration vector of ordered selection indices (MUX_SEL) from the multiplexer index calculator 410, along with input bit width value and optional "0" input. Based on the ordered selection indices (MUX_SEL) and specified bit width, the multiplexer selector 411 chooses in sequential order bits from one of the input control and data bit sequences for inserting only the "next" output bits into the output stream OUT. In addition, the multiplexer index calculator 411 may be embodied as a single instance 411-1 to multiplex one block of bits corresponding to one index value per cycle, or may be embodied as multiple or n instances 411-1 through 411-n to multiplex multiple blocks of bits corresponding to multiple index values per cycle.

In operation of the control and data multiplexing engine 400, the multiplexer index calculator 410 implements the LNS algorithm based on the plurality of index calculation parameters specified in the multiplexer configuration structure (MUX_CONFIG) to calculate the multiplexing selector action (denoted by MUX_SEL) at the multiplexer selector 411 for selecting from one of the input control and data bit sequences for output as the next set of output bit(s). To provide additional details for an improved understanding of selected embodiments of the present disclosure, reference is now made to FIG. 5 which depicts an example multiplexer configuration structure 500 that is used to control an index calculator.

As depicted, the multiplexer configuration structure 500 may include a plurality of dynamically configured index calculation parameters for the specific PUSCH transmission, each having a designated bit size. For example, a first parameter (P_ack) is a single bit which indicates whether bit puncturing is enabled. A second parameter (bits_RE) is a multi-bit scalar value which denotes the number of bits per resource element (RE) which can be multiplexed at a time. In embodiments where each resource element RE can contain from 1 to 128 bits, the second parameter may be represented with 7 bits. A third parameter (n_RE[14]) is a 14×1 vector which denotes the number of REs available for UL-SCH or UCI mapping per symbol within a 5G NR slot. A fourth parameter (n_ack_RE[14]) is a 14×1 vector which denotes the number of ACK REs to be mapped (or reserved, when puncturing is enabled) for each of the 14 symbols within a 5G NR slot. A fifth parameter (n_ack2_RE[14]) is a 14×1 vector which denotes actual number of ACK REs to be mapped for each of the symbols within the 5G NR slot in the case when puncturing is enabled. A sixth parameter (n_csi1_RE[14]) is a 14×1 vector which denotes number of CSI1 REs to be mapped for each of the symbols within the 5G NR slot. A seventh parameter (n_csi2_RE[14]) is a 14×1 vector which denotes number of CSI2 REs to be mapped for each of the symbols within 5G NR slot. An eighth parameter (n_ulsch_RE[14]) is a 14×1 vector which denotes number of UL-SCH REs to be mapped for each of the symbols within the 5G NR slot. A ninth parameter (d_ack[14]) is a 14×1 vector denoting a "skip offset" value for ACK REs (or reserved ACK REs when puncturing is enabled) for each of the symbols within the 5G NR slot. A tenth parameter (d_ack2[14]) is a 14×1 vector denoting a "secondary skip offset" value for ACK REs for each of the symbols within the 5G NR slot in the case when puncturing is enabled. An eleventh parameter (d_csi1[14]) is a 14×1 vector denoting a "skip offset" value for CSI1 REs for each of the symbols within the 5G NR slot. A twelfth parameter (d_csi2[14]) is a 14×1 vector denoting a "skip offset" value for CSI2 REs for each of the symbols within the 5G NR slot. With this example configuration structure 500, the size of the configuration message is about 1688 bits, and the computational cost is approximately 1000 FLOPs, representing a significant improvement over existing solutions for multiplexing the uplink control and data bits.

Using the index calculation parameters from the multiplexer configuration structure (MUX_CONFIG), the index calculation unit runs the LNS algorithm by using 1-step increment/decrement counters and some conditional execution logic to provide a very lightweight implementation of the data and control multiplexing algorithm in the 5G NR specification. To provide additional details for an improved understanding of selected embodiments of the present disclosure, there is provided herein below a pseudocode description of the LNS algorithm for generating the configuration vector of ordered selection indices (MUX_SEL) by using core logic to run internal loops of conditional logic to set the values of the ordered selection indices (MUX_SEL):

---

LNS Algorithm

Step 0:
- Set n = 0; k = 0;
- Set POS_ACK = 0; POS_CSI1 = 1; POS_CSI2 = 2; POS_ULSCH = 3; POS_RCSI2_ACK = 4; POS_RULSCH_ACK = 5; POS_ZERO = 6;

Step 1: Initialize
- n_ack = n_ack_RE[n];
- n_ack2 = n_ack2_RE[n];
- n_csi1 = n_csi1_RE[n];
- n_csi2 = n_csi2_RE[n];
- n_ulsch = n_ulsch_RE[n];
- d_ackc = d_ack[n];
- d_ack2c = d_ack2[n];
- d_csi1c = d_csi1[n];
- d_csi2c = d_csi2[n];
- next_ack_RE = 0;
- next_csi1_RE = 0;
- next_csi2_RE = 0;
- next_ulsch_RE = 0;
- rvd_counter = 0;
- j = 0;

Step 2: IF (n_RE[n] == 0) {Go to Step 5;}
ELSE {RVD_flag = 0; continue to Step 2a;}

- Step 2a: IF (n_ack > 0) && (next_ack_RE==0)
  - IF (P$_{ack}$==0) {MUX_SEL[k] = POS_ACK}; ELSE {RVD_flag=1;}
  - n_ack = n_ack-1;
  - next_ack_RE = d_ackc-1;
  - IF (P$_{ack}$==0) {Go to Step 3}; ELSE {Go to Step 2c}

- Step 2b: IF (n_csi1 > 0) && (next_csi1_RE==0)
  - MUX_SEL[k] = POS_CSI1;
  - n_csi1 = n_csi1-1;
  - next_csi1_RE = d_csi1c-1; next_ack_RE--;
  - Go to Step 3

- Step 2c: IF (n_csi2 > 0) && (next_csi2_RE==0)
  - IF ((RVD_flag==1) && (n_ack2 > 0) && (rvd counter==0))
    {MUX_SEL[k] = POS_RCSI2_ACK; rvd_counter = d_ack2-1; n_ack2--;}
  - ELSE
    {MUX_SEL[k] = POS_CSI2; if (RVD_flag==1) {rvd_counter--;} }
  - n_csi2 = n_csi2-1;
  - next_csi2_RE = d_csi2c-1;
  - IF (RVD_flag==0) {next_ack_RE--; next_csi1_RE--;}
  - Go to Step 3

- Step 2d: IF (n_ulsch > 0) && (next_ulsch_RE==0)
  - IF ((RVD_flag==1) && (n_ack2 > 0) && (rvd_counter==0))
    {MUX_SEL[k] = POS_RULSCH_ACK; rvd_counter = d_ack2-1;
    n_ack2--;}
  - ELSE
    {MUX_SEL[k] = POS_ULSCH; IF(RVD_flag==1) {rvd_counter--;}}
  - n_ulsch = n_ulsch-1;
  - next_ulsch_RE = 0; IF (RVD_flag==0) {next_ack_RE--; next_csi1_RE--;}
  - next_csi2_RE--;
  - Go to Step 3

- Step 2e: default
  - IF
    (RVD_flag==0) {MUX_SEL[k] = POS_ZERO;}
  - ELSE
    {MUX_SEL [k] = POS_ACK;}
  - Go to Step 3

Step 3: j = j + 1; k = k + 1;
Step 4: IF (j < n_RE[n]) {Go to Step 2}; ELSE {Go to Step 5}
Step 5: n = n + 1;
Step 6: IF (n < 14) {Go to Step 1}; ELSE {Go to Step 7}
Step 7: DONE

---

As seen above, the LNS algorithm includes a first setup step (Step 0) which initializes the counter values n, k and sets the predetermined index selection values (POS_ACK=0, POS_CSI1=1, POS_CSI2=2, POS_ULSCH=3, POS_RCSI2_ACK=4, POS_RULSCH_ACK=5, POS_ZERO=0. Next, the internal counters are initialized (Step 1) with values from the multiplexer configuration structure (in the case of n_ack=n_ack_RE[n]; n_ack2=n_ack2_RE[n]; n_csi1=n_csi1_RE[n]; n_csi2=n_csi2_RE[n]; n_ulsch=n_ulsch_RE[n]; d_ackc=d_ack[n]; d_ack2c=d_ack2[n]; d_csi1c=d_csi1[n]; and d_csi2c) or otherwise set to 0 (in the case of the counter values next_ack_RE, next_csi1_RE, next_csi2_RE, next_ulsch_RE, rvd_counter, and j). In steps 2-6, the LNS algorithm executes the conditional logic calculations using the internal counters with sub-steps 2a-2e to set the values of the ordered selection indices (MUX_SEL[1:T]) to one of the plurality of predetermined index selection values (POS_ACK, POS_CSI1, POS_CSI2, POS_ULSCH, POS_RCSI2_ACK, POS_RULSCH_ACK, POS_ZERO). Once all of the vector positions in the ordered selection indices MUX_SEL[1:T] are specified, the LNS algorithm is done (Step 7). Here, T denotes the total number of output REs for which indices need to be generated and is given by $$T = \sum_{n=0}^{13} \text{n\_RE}[n].$$

Using the ordered selection indices (MUX_SEL[1:T]), the multiplexer selector 411 selector works off a buffered set of "K" bits per incoming bit stream and selects from the buffer pertaining to the current value of the ordered selection indices (MUX_SEL). The "K" bit buffers continue to be replenished by the corresponding encoder chain as the control and data multiplexing engine 400 pulls bits from it. The entire logic can work in a sequential, pipelined manner. To provide additional details for an improved understanding of selected embodiments of the present disclosure, there is provided hereinbelow a pseudocode description of the operation of the multiplexer selector 411 which uses core logic to run internal loops of conditional logic to select bits from the incoming bit streams (ACK_IN, CSI1_IN, CSI2_IN, ULSCH_IN) for multiplexing into the output stream OUT in response to the specified values in the ordered selection indices (MUX_SEL):

---

MUX Selector

Step 1: k=0; ack_i=0; csi1_i=0; csi2_i=0; ulsch_i=0; out_i=0;
Step 2:
- IF (MUX_SEL[k] == POS_ACK || MUX_SEL[k] == POS_RCSI2_ACK || MUX_SEL[k] == POS_RULSCH_ACK)
  - FOR (i = 0; i < bits_RE; i++)
    - OUT[out_i++] = ACK_IN[ack_i++];
    - IF (MUX_SEL[k] == POS_RCSI2_ACK) {csi2_i++;}
    - IF (MUX_SEL[k] == POS_RULSCH_ACK) {ulsch_i++;}
- ELSEIF (MUX_SEL[k] == POS_CSI1)
  - FOR (i = 0; i < bits_RE; i++)
    - OUT[out_i++] = CSI1_IN[csi1_i++];
- ELSEIF (MUX_SEL[k] == POS_CSI2)
  - FOR (i = 0; i < bits_RE; i++)
    - OUT[out_i++] = CSI2_IN[csi2_i++];

| MUX Selector |
| --- |
| • ELSEIF (MUX_SEL[k] == POS_ULSCH)<br>    ■ FOR (i = 0; i < bits_RE; i++)<br>        · OUT[out_i++] = ULSCH_IN[ulsch_i++];<br>• ELSEIF (MUX_SEL[k] == POS_ZERO)<br>    ■ FOR (i = 0; i < bits_RE; i++)<br>        · OUT[out_i++] = 0;<br>• ELSE<br>    ■ ERROR<br>· Step 3: k = k + 1;<br>· Step 4: IF (last k) {Go to step 5;} ELSE {Go to Step 2;}<br>· Step 5: DONE |

As seen above, the output selection operation of multiplexer selector 411 includes an initialization setup step (Step 1) which resets the increment/decrement counter values k=0; ack_i=0; csi1_i=0; csi2_i=0; ulsch_i=0; out_i=0. In steps 2-4, the multiplex selection operation executes, for each of the selection indices in the MUX_SEL[1:T], a set of conditional logic loop calculations using the increment/decrement internal counters and the specified values in the ordered selection indices (MUX_SEL[1:T]) to select one of the input streams (ACK_IN, CSI1_IN, CSI2_IN, ULSCH_IN), punctured input streams, or the optional 0 input for output from the multiplex selector (OUT[out_i++]). Once all of the T ordered selection indices MUX_SEL[1:T] are specified, the output selection operation is done (Step 5).

Figure 6:
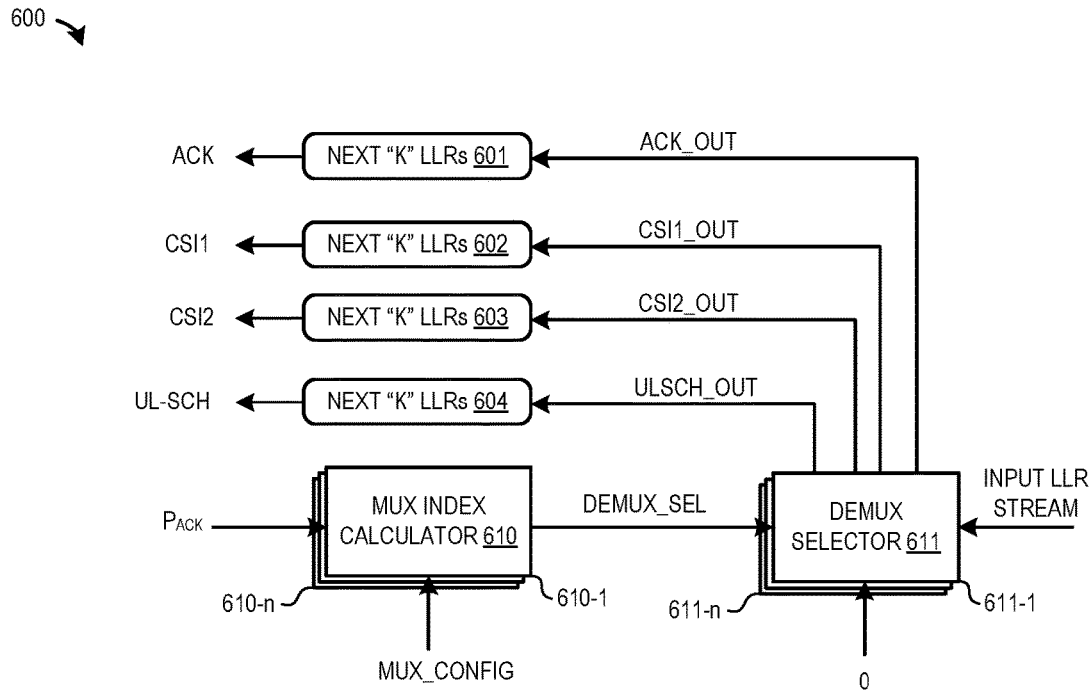
FIG. 6 is a simplified block diagram illustration of a control and data demultiplexing engine for use with downlink 5G NR transmissions in accordance with selected embodiments of the present disclosure.

To provide additional details for an improved understanding of selected embodiments of the present disclosure, reference is now made to FIG. 6 which illustrates a simplified block diagram illustration of a control and data demultiplexing engine 600 for use with demultiplexing control and data from a received 5G NR uplink transmission. As depicted, the control and data demultiplexing engine 600 includes output control and data LLR buffers 601-604 for storing the demultiplexed LLR values, a multiplexer index calculator 610 for generating selection indices under control of a configuration structure (MUX_CONFIG), and a demultiplexer selector 611 for receiving an input stream of LLR values and choosing k LLR values from the received input stream of LLR values for output to one of the output control and data LLR buffers 601-604 based on the selection indices (DEMUX_SEL) provided by the index calculation unit 610.

The demultiplexer selector 611 is connected to receive the input LLR stream (IN) that is provided as a digital baseband signal generated by the receive transceiver, and to select individual sequences of LLR values for demultiplexing into one of the output control LLR streams (e.g., ACK_OUT, CSI1_OUT, CSI2_OUT) and output data LLR streams (e.g., ULSCH_OUT) for storage on the K-LLR buffers 601-604. The K-LLR buffers 601-604 are continuously filled up by the demultiplexer selector 611 while the next stage blocks continuously drains the LLRs from these buffers for the subsequent stages of decoding. These buffers are drained at a rate commensurate with the rate at which these buffers are filled. This ensures that the entire logic can work in a sequential, pipelined manner. To control the selection, the demultiplexer selector 611 is also connected to receive the configuration vector of ordered selection indices (DEMUX_SEL) from the multiplexer index calculator 610, along with the optional "0" LLR input. Based on the ordered selection indices (DEMUX_SEL) and specified bit width, the multiplexer selector 611 selects and routes LLR values corresponding to each bit position for output to the corresponding output control and data LLR sequences.

The multiplexer index calculator 610 is connected to receive multiplexing control information, and to generate out an output configuration vector of ordered selection indices (DEMUX_SEL). As such, the multiplexer index calculator 610 is identical to the multiplexer index calculator 410 disclosed herein, except that each index refers to blocks of log-likelihood ratio (LLR) values corresponding to each bit position rather than block of bits as was the case with the multiplexer operation. In particular, the multiplexer index calculator 610 is controlled by the multiplexer configuration structure (MUX_CONFIG) and input puncture control bit $P_{ACK}$ which may be generated by one or more control processors. Again, the multiplexer configuration structure (MUX_CONFIG) may be a simple configuration structure, such as depicted in FIG. 5, that specifies a plurality of index calculation parameters for use in the lightweight iterative LNS multiplexing algorithm. In addition, the multiplexer index calculator 610 may be embodied as a single instance 610-1 to generate a single index value per cycle, or may be embodied as multiple or n instances 610-1 through 610-n to generate a multiple index values per cycle.

Under control of the ordered selection indices (DEMUX_SEL[1:T]), the demultiplexer selector 611 processes the input stream of LLR values (IN) for selective routing to the output streams (ACK_OUT, CSI1_OUT, CSI2_OUT, and ULSCH_OUT) for buffering in the set of "K" LLR buffers by selecting the output buffer pertaining to the current value of the ordered selection indices (DEMUX_SEL). Here, T denotes the total number of input REs to be demultiplexed and is given by $$T = \sum_{n=0}^{13} n\_RE[n].$$

The "K" LLR values stored in the output buffers 601-604 are then processed at the control processor(s) to extract the uplink control information (e.g., ACK, CSI1, CSI2) and data information (UL-SCH). To provide additional details for an selecting the understanding of selected embodiments of the present disclosure, there is provided hereinbelow a pseudo-code description of the operation of the demultiplexer selector 611 which uses core logic to run internal loops of conditional logic to demultiplex selected LLR values from the input stream of LLR values (IN) for output buffering to the output streams (ACK_OUT, CSI1_OUT, CSI2_OUT, ULSCH_OUT) based on the ordered selection indices (DEMUX_SEL):

| DeMUX Selector |
| --- |
| Step 1: k=0; ack_i=0; csi1_i=0; csi2_i=0; ulsch_i=0; in_i=0;<br>Step 2:<br>• IF (DEMUX[k] == POS_ACK \|\| DEMUX[k] ==<br>  POS_RCSI2_ACK \|\| DEMUX[k] == POS_RULSCH_ACK)<br>    ■ FOR (i = 0; i < bits_RE; i++)<br>        · ACK_OUT[ack_i++] = IN[in_i++];<br>        · IF (DEMUX[k] == POS_RCSI2_ACK)<br>          {CSI2_OUT[csi2_i++] = 0}<br>        · IF (DEMUX[k] == POS_RULSCH_ACK)<br>          {ULSCH_OUT[ulsch_i++] = 0}<br>• ELSEIF (DEMUX[k] == POS_CSI1)<br>    ■ FOR (i = 0; i < bits_RE; i++)<br>        · CSI1_OUT[csi1_i++] = IN[in_i ++];<br>• ELSEIF (DEMUX[k] == POS_CSI2)<br>    ■ FOR (i = 0; i < bits_RE; i++)<br>        · CSI2_OUT[csi2_i++] = IN[in_i ++]; |

-continued

| DeMUX Selector |
|---|
| • ELSEIF (DEMUX[k] == POS_ULSCH)<br>    ■ FOR (i = 0; i < bits_RE; i++)<br>        · ULSCH_OUT[ulsch_i++] = IN[in_i ++];<br>• ELSEIF (DEMUX[k] == POS_ZERO)<br>    ■ NOP<br>• ELSE<br>    ■ ERROR<br>Step 3: k = k + 1;<br>Step 4: IF (last k) {Go to step 5;} ELSE {Go to Step 2;}<br>Step 5: DONE |

As seen above, the output selection operation of demultiplexer selector 611 includes an initialization setup step (Step 1) which resets the increment/decrement counter values k=0; ack_i=0; csi1_i=0; csi2_i=0; ulsch_i=0; in_i=0. In steps 2-4, the demultiplex selection operation executes, for each of the k selection indices in the DEMUX_SEL[1:T], a set of conditional logic loop calculations using the increment/decrement internal counters and the specified values in the ordered selection indices (DEMUX_SEL[1:T]) to route the multiplex selector input (IN[in_i++]) (or a "0" value in the case of punctured bits) to a selected output stream (ACK_OUT, CSI1_OUT, CSI2_OUT, ULSCH_OUT). Once all of the T ordered selection indices DEMUX_SEL [1:T] are specified, the output selection operation is done (Step 5). In addition, the demultiplexer selector 611 may be embodied as a single instance 611-1 to demultiplex a single block of m-LLRs corresponding to one index value, or may be embodied as multiple or n instances 611-1 through 611-n to demultiplex multiple blocks of m-LLRs corresponding to multiple index values per cycle.

Figure 7:
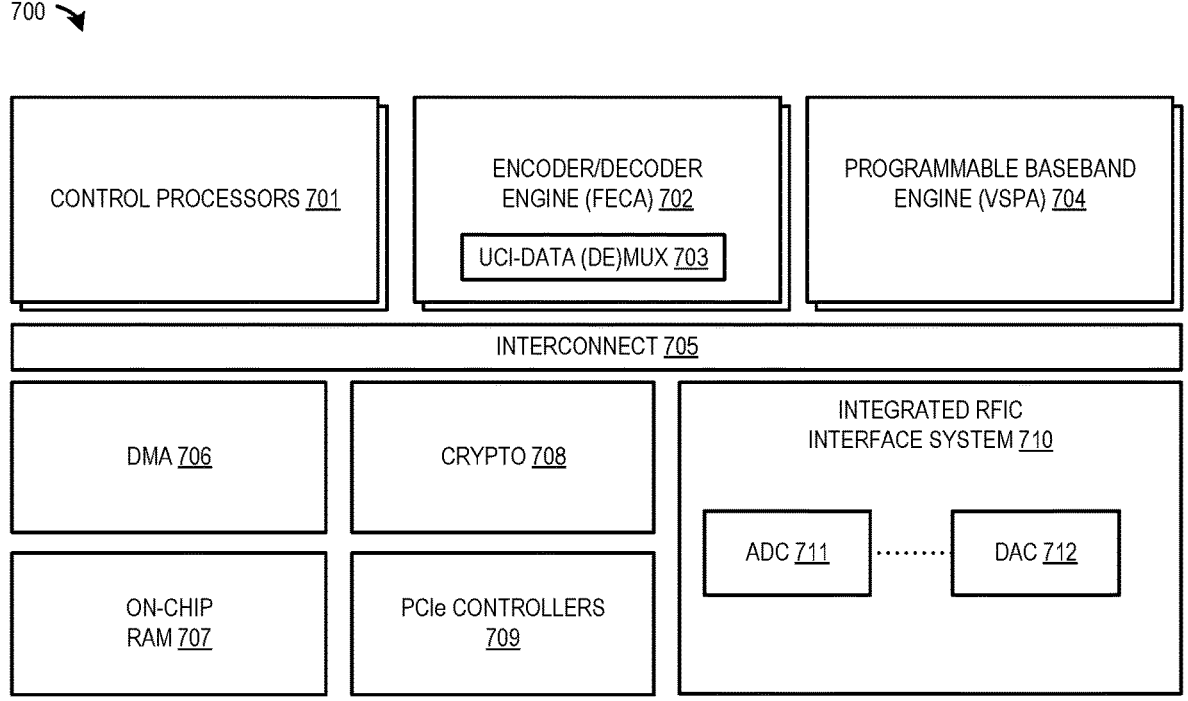
FIG. 7 is a high level block diagram of a programmable baseband processor for implementing 5G NR uplink control and data multiplexing and demultiplexing in accordance with selected embodiments of the present disclosure.

To provide additional details for an improved understanding of selected embodiments of the present disclosure, reference is now made to FIG. 7 which illustrates a high level block diagram of a programmable baseband processor 700 for implementing 5G NR uplink control and data multiplexing and demultiplexing. As depicted, the baseband processor 700 includes one or more control processor or central processing unit (CPU) subsystems 701, along with one or more encoder/decoder engines 702 and programmable baseband vector engines 704 for implementing Layer 1 PHY modem requirements. For example, the encoder/decoder engine 702 may include UCI-data multiplex/demultiplex 703 which is implemented with forward error correction accelerator (FECA) hardware. The processor(s) 701, encoder/decoder engine(s) 702, and programmable baseband engine(s) 704 may be connected over an on-chip interconnect 705 to a direct memory access (DMA) unit 706, on-chip random access memory (RAM) 707, cryptography engine 708, PCIe controllers 709, and an RF integrated circuit (RFIC) interface system 710 with analog-to-digital converters (ADC) 711 and digital-to-analog converters (DACs) 712, which may include integrated high speed and low speed ADC/DACs for mmWave and sub-6 GHz applications. In selected embodiments, the baseband processor 700 may be implemented as circuitry on a single integrated circuit or system-on-chip (SoC). In addition, the interconnect 705 can be any type of bus structure, including but not limited to a non-coherent interconnect, an advanced high-performance bus (AHB), or an advanced peripheral bus (APB). In addition, the control processor(s) 701 may be any type of processing circuit, including but not limited to a microprocessor (MPU), microcontroller (MCU), digital signal processor (DSP), or another type of processor or processor core with multiple levels of cache memory. Though not shown, the baseband processor 700 may include peripheral devices or special-purpose processors, communication interfaces, timers, encoders/decoders, and one or more external memory interfaces, such as DDR interface or flash interface. In turn, the external memory interfaces may be connected to external memory, such as DDR memory or flash memory.

As disclosed, the baseband processor 700 may use the control processor(s) 701 to provide programmable baseband engines that can perform Layer 1 and Layer 2 network processing in software to support 5G-NR fixed wireless edge access and 3GPP infrastructure equipment roles. In particular, the baseband processor 700 may split the PHY layer modem digital functionality into two major blocks, including a "symbol level signal processing" block (which is embodied in the programmable baseband vector engine(s) 704) and a "bit level processing" block (which is embodied in the encoder/decoder engine(s) 702).

On the transmit side, the encoder engine 702 implements "bit level processing" block to implement the Layer 1 PHY modem in software, up to and including forward error correction (FEC) encoding, UCI-data multiplexing/demultiplexing functions 703, and scrambling. In selected embodiments, the encoder engine 70 may be embodied as hardware which implements the LNS algorithm in the UCI-data multiplexer/demultiplexer 703 as a simple configuration-based state machine that calculates the "correct" candidate for the next output location without pre-calculating the locations for all input streams. Next, the programmable baseband engine 704 implements "symbol level signal processing" block that deals with the portion of the digital baseband chain following the scrambler and starting with modulation. In selected embodiments, the programmable baseband engine 704 may be embodied as a Vector Signal Processing Accelerator (VSPA) which includes multiple VSPA cores, each with its own single-instruction, multiple-data (SIMD) function units and floating-point hardware. On the receive side, the same blocks 702, 704 operate in a reversed order of sequence so that the programmable baseband engine 704 applies "symbol level signal processing" to demodulate the received signal, and the decoder engine 702 decodes and demultiplexes the demodulated signal. This leads to a very elegant pipelined implementation of the UCI-data multiplexing procedure with an output that is fully compliant with the 5G NR specification's data control multiplexing algorithm while being significantly cheaper in computational and hardware costs.

Figure 8:
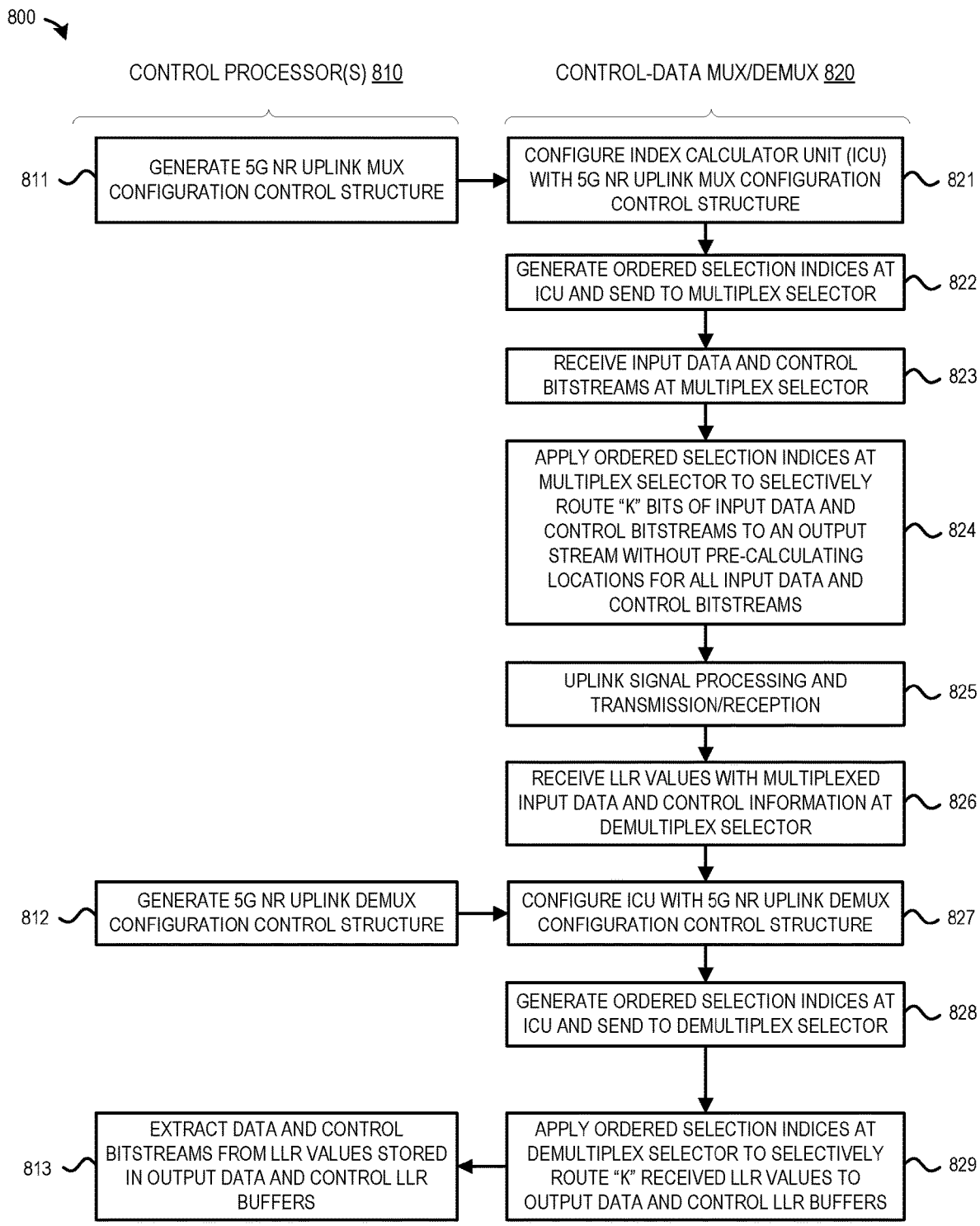
FIG. 8 is a simplified flow chart showing the logic for 5G NR uplink control and data multiplexing and demultiplexing in accordance with selected embodiments of the present disclosure.

Referring now to FIG. 8, there is depicted an example flow diagram 800 of a method and logic for performing 5G NR uplink control and data multiplexing and demultiplexing in accordance with selected embodiments of the present disclosure. In the flow diagram 800, the method steps may be performed by programmable vector processing software, hardware and/or firmware having an vector processing hardware accelerator stages which are controlled by a configuration control structure provided by one or more control processors to create a multiplexed output bit stream by configuring an index calculation unit with the configuration control structure to implement a lightweight iterative data-control multiplexing algorithm for generating selection indices in sequential order that are applied to a multiplex selector to choose bit(s) from one of the input control and data bit streams for the next output bit(s) based on the index provided by the index calculation unit for only the candidate for the "next" output location in each iteration, thereby avoiding the need to precompute for the entire output stream. At the receiver, the steps are reversed to demultiplex the received uplink transmission message into separate output control and data bit streams. By providing a data-control multiplexing/demultiplexing hardware wherein the encoder chains, the index calculation and the multiplex selection can be pipelined, the disclosed methods provide a compact, fast, and power efficient mechanism for processing uplink communications in next-generation mm-wave cellular communication systems, such as 5G-NR.

As a preliminary step in the method/logic, one or more control processors 810 generate a 5G NR uplink multiplex configuration control structure (step 811). As will be appreciated, the configuration control structure may include a plurality of index calculation parameters for use by an iterative Logical Next Step (LNS) multiplexing algorithm, such as depicted in FIG. 5, though the specific parameter types and values can vary based on modifications to the 5G NR specification. In addition, it will be understood that the control processor(s) 810 may periodically generate updated multiplex configuration control structures for each specific PUSCH transmission as needed during the 5G NR uplink control and data multiplexing operations.

At step 821, a control-data multiplexer/demultiplexer 820 at an uplink transmitting device, such as a user equipment device, may configure an index calculator unit (ICU) with the 5G NR uplink multiplex configuration control structure. In selected embodiments, the index calculation unit may be embodied in hardware as a state machine to implement the iterative Logical Next Step (LNS) multiplexing algorithm, and may be configured by loading the ICU with the index calculation parameters from the 5G NR uplink multiplex configuration control structure.

At step 822, the configured ICU generates ordered selection indices in sequential order as required by the control-data multiplexer output, and sends the selection indices to a multiplex selector at the control-data multiplexer/demultiplexer 820. In selected embodiments, the ordered selection indices (MUX_SEL) specify one of a plurality of predetermined index selection values for the input control and bit streams, including a first index selection value for a HARQ-ACK control bit (POS_ACK), a second index selection value for a CSI-1 control bit (POS_CSI1), a third index selection value for a CSI-2 control bit (POS_CSI2), fourth index selection value for a data bit (POS_ULSCH), a fifth index selection value for replacing CSI2 control bits with ACK control bits (POS_RCSI2_ACK), a sixth index selection value for replacing UL-SCH data bits with ACK control bits (POS_RULSCH_ACK), and a seventh index selection value for inserting the optional "0" input (POS_ZERO).

At step 823, the multiplex selector receives the input data and control bitstreams for an uplink 5G NR transmission. In selected embodiments, the received input data and control bitstreams may include input control bit streams (e.g., ACK_IN, CSI1_IN, CSI2_IN) and input data bit streams (e.g., ULSCH_IN) that are provided by the control processor(s) or stored at input buffers for storing individual buffered sequences of the input data and control bitstreams.

At step 824, the multiplex selector applies the ordered selection indices to selectively route "m" bits of the input data and control bitstreams to an output stream without pre-calculating locations for all of the input data and control bitstreams, thereby generating a multiplexed UCI-data bitstream. In selected embodiments, the multiplex selector may be embodied in hardware as a selector that chooses bit(s) from one of the input control and data bit streams for the next output bit(s) based on the ordered selection indices provided by the index calculation unit, thereby selecting bits from one of the input control and data bit sequences for insertion only into the "next" output bits into the output stream OUT.

At step 825, the uplink transmitting device performs additional transmit signal processing on the multiplexed UCI-data bitstream, including scrambling, modulation, and RF processing for transmitting the PUSCH containing the multiplexed data and UCI on the physical UL resources. The transmitted signal is then received at an uplink receiver where receive processing is applied to demodulate and descramble the received multiplexed UCI-data bitstream. For purposes of simplicity, step 825 also shows that the transmitted signal is received and processed at the control-data demultiplexer 820, though it will be appreciated that this receive processing is performed at a separate device using the same receive processing steps. In particular, the uplink receiver implements a demodulation chain and delivers LLRs corresponding to the combined bit stream to a descrambler which outputs the combined multiplexed UCI-data bitstream as a plurality of LLR values which need to be de-multiplexed to extract LLRs corresponding to the encoded bits from the multiple UCIs and the shared data channel.

At step 826, the demultiplex selector at the control-data demultiplexer 820 receives the plurality of LLR values from the received uplink 5G NR transmission which contain the multiplexed input data and control information. In selected embodiments, the demultiplex selector may be embodied in hardware as a simple demultiplexer circuit selector that chooses "m" LLR values from the received LLR values for routing to one of the output data and control buffers based on the ordered selection indices provided by the index calculation unit.

Either before or after the LLR values are received at step 826, one or more control processors 810 may generate a 5G NR uplink demultiplex configuration control structure (step 812). In selected embodiments, the demultiplex configuration control structure may include a plurality of index calculation parameters for configuring the index calculation unit, such as depicted in FIG. 5, though the specific parameter types and values can vary based on modifications to the 5G NR specification. In addition, it will be understood that the control processor(s) 810 may periodically generate updated demultiplex configuration control structures for each specific PUSCH transmission as needed during the 5G NR uplink control and data multiplexing operations.

At step 827, a control-data multiplexer/demultiplexer 820 at an uplink receiver, such as a base station or gNB device, may configure the index calculator unit with the 5G NR uplink demultiplex configuration control structure. In selected embodiments, the index calculation unit may be embodied in hardware as a state machine to implement the iterative Logical Next Step (LNS) multiplexing algorithm, and may be configured by loading the ICU with the index calculation parameters from the 5G NR uplink demultiplex configuration control structure.

At step 828, the configured ICU generates ordered selection indices in sequential order as required by the control-data demultiplexer output, and sends the selection indices to a demultiplex selector at the control-data multiplexer/demultiplexer 820. In selected embodiments, the ordered selection indices (DEMUX_SEL) specify one of a plurality of predetermined index selection values for the input control and LLR streams, including a first index selection value for a HARQ-ACK control LLR (POS_ACK), a second index selection value for a CSI-1 control LLR (POS_CSI1), a third index selection value for a CSI-2 control LLR (POS_CSI2), fourth index selection value for a data LLR (POS_ULSCH), a fifth index selection value for selecting both CSI2 control LLR and ACK control LLR by routing the LLR from the input stream to ACK and by routing a 0 LLR to CSI2 (POS_RCSI2_ACK), a sixth index selection value for selecting both UL-SCH data LLR and ACK control LLR by routing the LLR from the input stream to ACK and by routing a 0 LLR to UL-SCH (POS_RULSCH_ACK), and a seventh index selection value for inserting the optional "0" input (POS_ZERO).

At step 829, the demultiplex selector applies the ordered selection indices to selectively route "m" LLR values to output data and control LLR buffers for the output data and control bitstreams, thereby generating a demultiplexed uplink control and data bitstreams. In selected embodiments, the demultiplex selector may be embodied in hardware as a selector that chooses "m" LLR values from an input stream of LLR values for routing to the output data and control LLR buffer specified in the ordered selection indices provided by the index calculation unit. The LLRs corresponding to UCI bits in the control LLR buffers are sent to their respective polar decoders while the LLRs corresponding to data bits in the data LLR buffers are sent to the LDPC decoder.

By now it should be appreciated that there has been provided an apparatus, method, program code, and system for multiplexing a data bitstream and one or more uplink control bitstreams for transmission on a new radio (NR) physical uplink channel, which may include a physical uplink shared channel and physical uplink control channel used in a next generation 5G millimeter-wave wireless system. In selected embodiments, the data bitstream may be a UL-SCH data type, and the one or more uplink control bitstreams may be selected from at least one of an acknowledgment (ACK) control type bitstream, a first channel state information (CSI1) control type bitstream, and a second channel state information (CSI2) control type bitstream. In selected embodiments, the apparatus may be a UE device which includes one or more processors configured to generate a multiplexing configuration structure. In selected embodiments, multiplexing configuration structure is a configuration vector of ordered selection indices. The apparatus may also include a multiplexing engine connected to receive and multiplex the data bitstream and one or more uplink control bitstreams. The disclosed multiplexing engine includes an index calculation logic circuit configured with the multiplexing configuration structure to execute an iterative data-control multiplexing algorithm which generates ordered selection indices in sequential order. In selected embodiments, the index calculation logic circuit is configured to generate n selection indices per clock cycle, where n is an integer $\geq 1$. In selected embodiments, the iterative data-control multiplexing algorithm calculates an index value for routing each selected m-bit sequence to a "next" output location in the multiplexed output stream without pre-calculating all output locations in the multiplexed output stream for all data bitstream and one or more uplink control bitstreams. In other embodiments, the iterative data-control multiplexing algorithm calculates, for each subsequent output location in the multiplexed output stream, one per iteration, a selection index value for one of the m-bit sequences from the data bitstream and one or more uplink control bitstreams. In selected embodiments, the index calculation logic circuit is embodied as a hardware state machine. The disclosed multiplexing engine also includes a multiplex selector circuit which is connected to receive and select m-bit sequences from the data bitstream and one or more uplink control bitstreams and to write each selected m-bit sequence into a multiplexed output stream of m-bit sequences from the data bitstream and one or more uplink control bitstreams according to the ordered selection indices generated by the index calculation unit. In selected embodiments, the multiplex selector circuit is configured to multiplex n instances of m-bit sequences per clock cycle, where m in an integer $\geq 1$, and, n is an integer $\geq 1$. In selected embodiments, the multiplexing engine is configured to puncture an uplink channel transmission in a single step by multiplexing to the output location, m-bits from the second input stream, and, in parallel, discarding m-bits from the first input stream, and, where m is an integer $\geq 1$. The apparatus may also include a scrambler that scrambles the multiplexed output stream of m-bit sequences from the data bitstream and one or more uplink control bitstreams to generate a scrambled bit sequence, and a downstream processor that modulates the scrambled bit sequence to produce modulated symbols.

In another form, there has been provided an apparatus, method, program code, and system for demultiplexing a plurality of log likelihood ratio (LLR) values that are demodulated from a signal received over a new radio (NR) physical uplink channel used in a next generation 5G millimeter-wave wireless system. The disclosed demultiplexing apparatus includes one or more processors configured to generate a demultiplexing configuration structure. In selected embodiments, the demultiplexing configuration structure is a configuration vector of ordered selection indices. The disclosed demultiplexing apparatus also includes a demultiplexing engine connected to receive and demultiplex the plurality of LLR values into a data LLR values and one or more uplink control information LLR values, the demultiplexing engine. The disclosed demultiplexing engine includes an index calculation logic circuit configured with the demultiplexing configuration structure to execute an iterative data-control demultiplexing algorithm which generates ordered selection indices in sequential order. In selected embodiments, the index calculation logic circuit is embodied as a hardware state machine. In selected embodiments, the index calculation logic circuit is configured to generate n selection indices per clock cycle, where n is an integer $\geq 1$. The disclosed demultiplexing engine also includes a demultiplex selector circuit which is connected to receive and select m LLR values from the plurality of LLR values and to write each selected m LLR values into an output stream for data LLR values or an output stream for one or more uplink control information LLR values according to the ordered selection indices generated by the index calculation unit where m is an integer greater than or equal to 1. In selected embodiments, the demultiplex selector circuit is configured to demultiplex n instances of m-LLR sequences per clock cycle, where m is an integer $\geq 1$, and, n is an integer $\geq 1$. In selected embodiments, the output stream for data LLR values are decoded into an UL-SCH data bitstream, and the output stream for one or more uplink control information LLR values are decoded into at least one of an acknowledgment (ACK) control bitstream, a first channel state information (CSI1) control bitstream, and a second channel state information (CSI2) control bitstream. In selected embodiments, the demultiplexing engine is configured to process punctured resources by copying the m LLRs from the incoming stream to the output LLR buffer corresponding to the second input stream while m zero valued LLRs are written in parallel to output LLRs buffer corresponding to the first input stream, the where m is an integer $\geq 1$.

In yet another form, there is provided an apparatus, method, program code, and system for multiplexing a data bitstream and one or more uplink control bitstreams for transmission on a new radio (NR) physical uplink channel. In the disclosed methodology, an input data bitstream and one or more uplink control bitstreams are received. In selected embodiments, the input data bitstream is received as a UL-SCH data type bitstream, and the one or more uplink control bitstreams are received as at least one of an acknowledgment (ACK) control type bitstream, a first channel state information (CSI1) control type bitstream, and a second channel state information (CSI2) control type bitstream. In addition, a multiplexing configuration structure is generated at one or more processors. In selected embodiments the multiplexing configuration structure is generated by the processor(s) as a configuration vector of ordered selection indices. In addition, an iterative data-control multiplexing algorithm is executed at an index calculation logic circuit configured with the multiplexing configuration structure to generate ordered selection indices in sequential order. In selected embodiments, the iterative data-control multiplexing algorithm is executed to calculate an index value for routing each selected m-bit sequence to a "next" output location in the multiplexed output stream without pre-calculating all output locations in the multiplexed output stream for all data bitstream and one or more uplink control bitstreams. In selected embodiments, the execution of the iterative data-control multiplexing algorithm includes calculating, for each subsequent output location in the multiplexed output stream, one per iteration, a selection index value for one of the m-bit sequences from the data bitstream and one or more uplink control bitstreams. In other embodiments, the execution of the iterative data-control multiplexing algorithm includes executing the index calculation logic circuit with a hardware state machine. A multiplex selector circuit selects m-bit sequences from the data bitstream and one or more uplink control bitstreams according to the ordered selection indices generated by the index calculation unit and then writes each selected m-bit sequence into a multiplexed output stream, where m is an integer greater than or equal to 1. As disclosed, the iterative data-control multiplexing algorithm calculates an index value for routing each selected m-bit sequence to a "next" output location in the multiplexed output stream without pre-calculating all output locations in the multiplexed output stream for all data bitstream and one or more uplink control bitstreams. In selected embodiments, the disclosed methodology also includes scrambling the multiplexed output stream of m-bit sequences from the data bitstream and one or more uplink control bitstreams to generate a scrambled bit sequence, and modulating the scrambled bit sequence to produce modulated symbols.

In still yet another form, there is provided an apparatus, method, program code, and system for demultiplexing a plurality of log likelihood ratio (LLR) values. In the disclosed methodology, a plurality of LLR values are received that are demodulated from a signal received over a new radio (NR) physical uplink channel. In addition, a demultiplexing configuration structure is generated at one or more processors. In addition, an iterative data-control demultiplexing algorithm is executed at an index calculation logic circuit configured with the demultiplexing configuration structure to generate ordered selection indices in sequential order. A demultiplex selector circuit selects m LLR values from the plurality of LLR values according to the ordered selection indices generated by the index calculation unit where m is an integer greater than or equal to 1, and then writes each selected m LLR values into an output stream for data LLR values or an output stream for one or more uplink control information LLR values according to the ordered selection indices generated by the index calculation unit where m is an integer greater than or equal to 1.

The methods and systems for multiplexing and demultiplexing a data bitstream and one or more uplink control bitstreams for transmission on a new radio (NR) physical uplink channel as shown and described herein may be implemented at least in part with software stored on a computer-readable medium and executed as a computer program on a general purpose or special purpose computer to perform certain tasks. For aspects of the present disclosure implemented in hardware, the elements used to perform various multiplexing and demultiplexing steps at an UL transmitter or user equipment (UE) (e.g., receiving data and uplink control bitstreams, generating a multiplexing configuration structure, configuring an index calculation logic circuit with the multiplexing configuration structure, executing an iterative data-control multiplexing algorithm to generate ordered selection indices in sequential order, selecting m-bit sequences from the data bitstream and one or more uplink control bitstreams, writing each selected m-bit sequence into a multiplexed output stream of m-bit sequences from the data bitstream and one or more uplink control bitstreams according to the ordered selection indices generated by the index calculation unit, and so on) and/or at the UL receiver or base station (gNB) (e.g., receiving and demodulating a transmitted UL message into a plurality of LLR values, generating a demultiplexing configuration structure, configuring an index calculation logic circuit with the demultiplexing configuration structure, executing an iterative data-control demultiplexing algorithm to generate ordered selection indices in sequential order, selecting "m" LLR values from the plurality of LLR values, writing each selected "m" LLR value sequence into an output data LLR buffer and one or more output control LLR buffers according to the ordered selection indices generated by the index calculation unit, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the UL transmitter and UL receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein focus on 5G and mm-wave systems and methods for using same, the present invention is not necessarily limited to the example embodiments illustrate herein and may be applied to any wireless system that uses beamforming to extend signal range, coverage and/or throughput. For example, various embodiments of an initial cell search system and design methodology disclosed herein may be implemented in connection with various proprietary or wireless communication standards, such as IEEE 802.16e, 3GPP-LTE, 4GPP-LTE, 5GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus for multiplexing a data bitstream and one or more uplink control bitstreams for transmission on a new radio (NR) physical uplink channel, comprising:
   one or more processors configured to generate a multiplexing configuration structure; and
   a multiplexing engine connected to receive and multiplex the data bitstream and one or more uplink control bitstreams, the multiplexing engine comprising:
     an index calculation logic circuit configured with the multiplexing configuration structure to execute an iterative data-control multiplexing algorithm which generates ordered selection indices in sequential order; and
     a multiplex selector circuit which is connected to receive and select m-bit sequences from the data bitstream and one or more uplink control bitstreams and to write each selected m-bit sequence into a multiplexed output stream of m-bit sequences from the data bitstream and one or more uplink control bitstreams according to the ordered selection indices generated by the index calculation unit where m is an integer greater than or equal to 1.

2. The apparatus of claim 1, where the index calculation logic circuit is configured to generate n selection indices per clock cycle, where n is an integer ≥1.

3. The apparatus of claim 1, where the index calculation logic circuit comprises a hardware state machine.

4. The apparatus of claim 1, where the multiplexing configuration structure comprises a configuration vector of ordered selection indices.

5. The apparatus of claim 1, where the iterative data-control multiplexing algorithm calculates an index value for routing each selected m-bit sequence to a next output location in the multiplexed output stream without pre-calculating all output locations in the multiplexed output stream for all data bitstream and one or more uplink control bitstreams.

6. The apparatus of claim 1, where the iterative data-control multiplexing algorithm calculates, for each subsequent output location in the multiplexed output stream, one per iteration, a selection index value for one of the m-bit sequences from the data bitstream and one or more uplink control bitstreams.

7. The apparatus of claim 1, where the multiplex selector circuit is configured to multiplex n instances of m-bit sequences per clock cycle, where m in an integer ≥1, and, n is an integer ≥1.

8. The apparatus of claim 1, where the multiplexing engine is configured to puncture an uplink channel transmission in a single step by multiplexing to the output location, m-bits from the second input stream, and, in parallel, discarding m-bits from the first input stream, and, where m is an integer ≥1.

9. An apparatus for demultiplexing a plurality of log likelihood ratio (LLR) values that are demodulated from a signal received over a new radio (NR) physical uplink channel, comprising:
   one or more processors configured to generate a demultiplexing configuration structure; and
   a demultiplexing engine connected to receive and demultiplex the plurality of LLR values into a data LLR values and one or more uplink control information LLR values, the demultiplexing engine comprising:
     an index calculation logic circuit configured with the demultiplexing configuration structure to execute an iterative data-control demultiplexing algorithm which generates ordered selection indices in sequential order; and
     a demultiplex selector circuit which is connected to receive and select m LLR values from the plurality of LLR values and to write each selected m LLR values into an output stream for data LLR values or an output stream for one or more uplink control information LLR values according to the ordered selection indices generated by the index calculation unit where m is an integer greater than or equal to 1.

10. The apparatus of claim 9, where the index calculation logic circuit is configured to generate n selection indices per clock cycle, where n is an integer ≥1.

11. The apparatus of claim 9, where the demultiplex selector circuit is configured to demultiplex n instances of m-LLR sequences per clock cycle, where m is an integer ≥1, and, n is an integer ≥1.

12. The apparatus of claim 9, where the index calculation logic circuit comprises a hardware state machine.

13. The apparatus of claim 9, where the demultiplexing configuration structure comprises a configuration vector of ordered selection indices.

14. The apparatus of claim 9, where the demultiplexing engine is configured to process punctured resources by copying the m LLRs from the incoming stream to the output LLR buffer corresponding to the second input stream while m zero valued LLRs are written in parallel to output LLRs buffer corresponding to the first input stream, the where m is an integer ≥1.

15. A method for multiplexing a data bitstream and one or more uplink control bitstreams for transmission on a new radio (NR) physical uplink channel, comprising:
   receiving an input data bitstream and one or more uplink control bitstreams;

generating, at one or more processors, a multiplexing configuration structure;

executing, at an index calculation logic circuit configured with the multiplexing configuration structure, an iterative data-control multiplexing algorithm which generates ordered selection indices in sequential order;

selecting, by a multiplex selector circuit, m-bit sequences from the data bitstream and one or more uplink control bitstreams according to the ordered selection indices generated by the index calculation unit where m is an integer greater than or equal to 1; and writing, by the multiplex selector circuit, each selected m-bit sequence into a multiplexed output stream, where the iterative data-control multiplexing algorithm calculates an index value for routing each selected m-bit sequence to a next output location in the multiplexed output stream without pre-calculating all output locations in the multiplexed output stream for all data bitstream and one or more uplink control bitstreams.

16. The method of claim 15, where one or more processors generate the multiplexing configuration structure as a configuration vector of ordered selection indices.

17. The method of claim 15, where executing the iterative data-control multiplexing algorithm comprises calculates an index value for routing each selected m-bit sequence to a next output location in the multiplexed output stream without pre-calculating all output locations in the multiplexed output stream for all data bitstream and one or more uplink control bitstreams.

18. The method of claim 15, where executing the iterative data-control multiplexing algorithm comprises calculating, for each subsequent output location in the multiplexed output stream, one per iteration, a selection index value for one of the m-bit sequences from the data bitstream and one or more uplink control bitstreams.

19. The method of claim 15, where executing the iterative data-control multiplexing algorithm comprises executing the index calculation logic circuit with a hardware state machine.

20. A method for demultiplexing a plurality of log likelihood ratio (LLR) values, comprising:

receiving a plurality of LLR values that are demodulated from a signal received over a new radio (NR) physical uplink channel;

generating, at one or more processors, a demultiplexing configuration structure;

executing, at an index calculation logic circuit configured with the demultiplexing configuration structure, an iterative data-control demultiplexing algorithm which generates ordered selection indices in sequential order; and selecting, by a demultiplex selector circuit, m LLR values from the plurality of LLR values according to the ordered selection indices generated by the index calculation unit where m is an integer greater than or equal to 1;

writing, by the demultiplex selector circuit, each selected m LLR values into an output stream for data LLR values or an output stream for one or more uplink control information LLR values according to the ordered selection indices generated by the index calculation unit where m is an integer greater than or equal to 1.

* * * * *